US011248581B2

(12) United States Patent
Küster

(10) Patent No.: US 11,248,581 B2
(45) Date of Patent: Feb. 15, 2022

(54) FLOW ENERGY INSTALLATION, IN PARTICULAR ENCASED WIND TURBINE

(71) Applicant: FLOWGEN DEVELOPMENT & MANAGEMENT AG, Zug (CH)

(72) Inventor: Dirk Küster, Benglen (CH)

(73) Assignee: FLOWGEN DEVELOPMENT & MANAGEMENT AG, Zug (CH)

( * ) Notice: Subject to any disclaimer, the term of this patent is extended or adjusted under 35 U.S.C. 154(b) by 0 days.

(21) Appl. No.: 16/757,666

(22) PCT Filed: Aug. 16, 2018

(86) PCT No.: PCT/EP2018/072164
§ 371 (c)(1),
(2) Date: Apr. 20, 2020

(87) PCT Pub. No.: WO2019/076514
PCT Pub. Date: Apr. 25, 2019

(65) Prior Publication Data
US 2021/0199085 A1    Jul. 1, 2021

(30) Foreign Application Priority Data

Oct. 20, 2017 (EP) .................................. 17197490

(51) Int. Cl.
*F03D 1/04* (2006.01)
*F03D 9/25* (2016.01)

(52) U.S. Cl.
CPC ................. *F03D 1/04* (2013.01); *F03D 9/25* (2016.05); *F05B 2240/133* (2013.01)

(58) Field of Classification Search
CPC ......... F03D 1/04; F03D 9/25; F05B 2240/133
(Continued)

(56) References Cited

U.S. PATENT DOCUMENTS 4,021,135 A * 5/1977 Pedersen .................. F03D 1/04
                                                      415/208.2
4,110,631 A * 8/1978 Salter ..................... F03D 15/20
                                                      290/55
(Continued)

FOREIGN PATENT DOCUMENTS

DE          30 49 791 A1      1/1983
DE    10 2011 016 141 A1      9/2012
(Continued)

OTHER PUBLICATIONS

Sep. 20, 2018 International Search Report issued in International Patent Application No. PCT/EP2018/072164.

*Primary Examiner* — Charles Reid, Jr.
(74) *Attorney, Agent, or Firm* — Oliff PLC

(57) ABSTRACT

An encased wind turbine has a casing, rotationally symmetrical in relation to the longitudinal axis and has the cross-section of an airfoil. The radially inner upper side delimits a flow channel. A guide element is rotationally symmetrical in relation to the longitudinal axis projects by part of its length, contrary to the direction of flow, over the casing. The propeller drives a generator, arranged in the housing, for generating electrical energy. The propeller viewed in the direction of flow, is located at least approximately at the guide-element trailing edge. Impinged on by the main flow of the wind, while a bypass flow, owing to the airfoil profile, generates a negative pressure downstream from the guide element and thus accelerates the main flow, is generated between the casing and the guide element. The propeller may be located downstream from the guide element and arranged to be adjustable in its longitudinal position.

17 Claims, 4 Drawing Sheets

Figure 1:
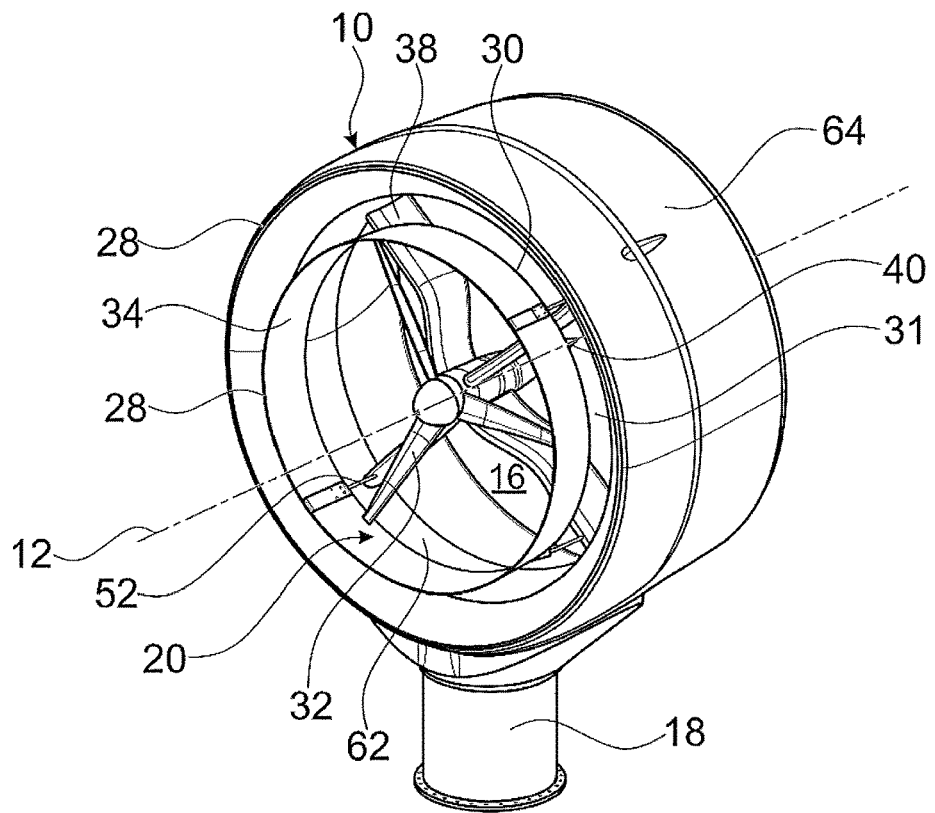

(58) Field of Classification Search
USPC .................................................. 290/44, 55
See application file for complete search history.

(56) References Cited

U.S. PATENT DOCUMENTS

| | | | | |
|---|---|---|---|---|
| 4,140,433 | A * | 2/1979 | Eckel | F03D 1/0658 415/209.1 |
| 2008/0240916 | A1 * | 10/2008 | Krouse | F03B 11/02 415/211.2 |
| 2009/0087308 | A2 | 4/2009 | Presz et al. | |
| 2009/0091136 | A1 * | 4/2009 | Viterna | B63B 21/50 290/55 |
| 2010/0068052 | A1 | 3/2010 | Werle et al. | |
| 2010/0316487 | A1 * | 12/2010 | Presz, Jr. | H02S 10/12 415/121.3 |
| 2011/0008164 | A1 * | 1/2011 | Presz, Jr. | F03D 1/04 415/211.2 |
| 2011/0133474 | A1 * | 6/2011 | Haar | F03D 3/06 290/55 |
| 2011/0187115 | A1 * | 8/2011 | Piasecki | F03D 13/20 290/55 |
| 2012/0038170 | A1 * | 2/2012 | Stuart | F03D 9/28 290/55 |
| 2013/0313827 | A1 * | 11/2013 | Lovmand | H02J 3/1885 290/44 |

FOREIGN PATENT DOCUMENTS

| | | | | |
|---|---|---|---|---|
| DE | 102011016141 A1 * | 9/2012 | ........... | F03D 1/0625 |
| WO | 2008/118405 A2 | 10/2008 | | |
| WO | 2009/120176 A2 | 10/2009 | | |
| WO | 2009/129420 A1 | 10/2009 | | |
| WO | 2010028342 A2 | 3/2010 | | |
| WO | 2010/036216 A1 | 4/2010 | | |
| WO | 2010/036678 A1 | 4/2010 | | |
| WO | 2010/065647 A2 | 6/2010 | | |
| WO | 2010/114819 A1 | 10/2010 | | |
| WO | 2010/120487 A1 | 10/2010 | | |
| WO | 2010/141687 A2 | 12/2010 | | |
| WO | 2010/141698 A2 | 12/2010 | | |
| WO | 2010/141807 A2 | 12/2010 | | |
| WO | 2010141715 A2 | 12/2010 | | |
| WO | 2011/002979 A2 | 1/2011 | | |
| WO | 2011/031365 A2 | 3/2011 | | |
| WO | 2011/094569 A1 | 8/2011 | | |
| WO | 2011100536 A1 | 8/2011 | | |
| WO | 2011/140410 A1 | 11/2011 | | |
| WO | 2012/068466 A1 | 5/2012 | | |
| WO | 2012/068536 A1 | 5/2012 | | |
| WO | 2014/136032 A1 | 9/2014 | | |

* cited by examiner

FLOW ENERGY INSTALLATION, IN PARTICULAR ENCASED WIND TURBINE

The present invention relates to a flow energy installation, in particular an encased wind turbine, having the features of claim 1.

An encased wind turbine is known, for example, from the document US 2010/0068052 A1. It has an impeller surrounded by a turbine shroud, and has an ejector shroud, the turbine shroud and/or the ejector shroud having inflatable portions and/or flexible inflatable regions. The turbine shroud and/or the ejector shroud may have internal ribs, the shape and length of which can be varied to alter the characteristics of the encased wind turbine.

The document WO 2014/136032 A1 discloses an encased wind turbine in which the propeller is located at the least inside width of the flow channel formed by a casing. The guide-element leading edge of a guide element is arranged upstream from the leading edge of the casing, in the direction of flow of the fluid, and the guide-element trailing edge is arranged exactly at the leading edge of the casing, in the direction of flow of the fluid.

A further encased wind turbine is known from the document US 2009/0087308 A2. It has an aerodynamically shaped turbine shroud, having an inlet, a ring of stator vanes, an impeller, composed of a ring of rotating blades, in line with the stator vanes, and a mixer/ejector pump to increase the air flow rate through the turbine by rapidly mixing the turbine exit flow with the high-energy bypass wind-flow.

In addition, the document DE 30 49 791 A1 also discloses an encased wind turbine.

It is an object of the present invention to create a flow energy installation, in particular an encased wind turbine, that has a high efficiency and a simple structure.

This object is achieved with a flow energy installation, or encased wind turbine, according to claim 1.

The flow energy installation, which serves, in particular as an encased wind turbine, has an annular, preferably self-contained casing, which is at least approximately rotationally symmetrical in relation to a longitudinal axis, and which has the cross-section of an airfoil profile. Preferably, the casing is rigid, and thus unchangeable.

The casing that forms a shell of the flow energy installation, in particular the encased turbine, delimits with its upper side, which is radially inward with respect to the longitudinal axis, a flow channel for a fluid that drives the flow energy installation. When the flow energy installation is used as an encased wind turbine, the air moved by the wind forms the fluid.

The flow energy installation, in particular encased wind turbine, additionally has an annular, preferably self-contained guide element, which is at least approximately rotationally symmetrical in relation to a longitudinal axis, and the greatest external diameter of which is less than the least inside width of the flow channel. The upstream end of the guide element, i.e. the guide-element leading edge, is arranged upstream from the leading edge of the casing in the direction of flow of the fluid, the downstream end of the guide element, i.e. the guide-element trailing edge, being arranged downstream from the leading edge of the casing and upstream from the least inside width of the flow channel. The guide element is thus located partially in the flow channel and partially upstream, outside of the flow channel.

The flow energy installation, in particular encased wind turbine, additionally has a propeller, which is rotatable about the longitudinal axis and is impinged on by the fluid, or wind, and which drives an electrical generator for the purpose of generating electrical energy.

The propeller, as viewed in the direction of flow, is located at least approximately at the guide-element trailing edge, preferably in a downstream end portion of the guide element that, measured in the direction of the longitudinal axis and from the guide-element trailing edge, extends over a quarter, preferably over a fifth, of the length of the guide element.

The propeller, as viewed in the radial direction, extends as far as a gap between itself and the guide element. The diameter of the propeller is thus preferably at least approximately as great as the inside width of the guide element 80.

Further, it is possible for the propeller to be located downstream from the guide-element trailing edge, but upstream from the least inside width of the flow channel.

It should be mentioned in this regard that there is preferably a drive element that sets the axial position of the propeller. This embodiment allows an optimal adaptation to differing wind conditions.

If the propeller is arranged downstream from the guide element, its diameter is preferably at least approximately of the same magnitude as the inside width of the guide element 80. In the case of this arrangement, however, a larger diameter may be selected, in order also to be impinged on by bypass flow.

In the case of the flow energy installation according to the invention, in particular encased wind turbine, there is generated between the casing and the guide element a bypass flow that, owing to the airfoil profile of the casing, generates a negative pressure at the least inside width of the flow channel, and thus accelerates the main flow impinging on the propeller and flowing through the main-flow channel formed by the guide element. This results in high efficiency.

Preferably, projecting inwardly from the casing, at least approximately in the radial direction, there are supports, which support the generator housing. The latter preferably has an at least approximately drop-shaped longitudinal section that is at least approximately rotationally symmetrical in relation to the longitudinal axis. The generator is arranged in the generator housing, preferably in its stationary part that is fixedly connected to the supports. Preferably, a shaft that carries the propeller and that is connected to the generator projects, contrary to the direction of flow, over the stationary part of the generator housing, a nose cap seated on the shaft forming a part of the generator housing that rotates concomitantly with the shaft, and thus with the propeller.

This embodiment further helps to minimize drag, in order to create optimum flow conditions.

Preferably, an outer portion of the supports that adjoins the casing runs approximately at right angles to the longitudinal direction, and in a straight line. Preferably, between the outer portion and the generator housing the supports have an inner portion bent at least approximately in an S shape. Preferably, the supports have a first curvature, contrary the direction of flow, adjoining the outer portion, and an opposite, second curvature, adjoining the generator housing, such that the radially inner end of the supports again runs at least approximately at right angles to the longitudinal axis. Preferably, the supports run in a straight line between the two curvatures, for example at an angle of at least approximately 45° in relation to the longitudinal axis.

Furthermore, the supports preferably have a symmetrical profile, in particular a symmetrical airfoil profile, again in order to minimize the drag.

Preferably the guide element is supported by element supports, which project from the supports, contrary the direction of flow. Preferably, these element supports are realized in a straight line and are aligned at least approximately parallel to the longitudinal axis. They thus run in the direction of flow, which keeps the drag to a minimum.

Measured in the direction of the longitudinal axis, the length of the guide element is preferably 15% to 30% of the length of the casing, measured in the direction of the longitudinal axis. Particularly preferably, the length of the guide element is preferably at least approximately 22% to 24% of the length of the casing.

Measured in the direction of the longitudinal axis, the guide element projects by 30% to 50% of its length, contrary to the direction of flow, over the casing, i.e. with respect to the leading edge of the casing. Particularly preferably, the projection is at least approximately 40%. Consequently, preferably 50% to 70%, particularly preferably at least approximately 60%, of the length of the guide element is located in the flow channel formed by the casing.

The external diameter of the guide element is preferably 85% to 96% of the inside width of the flow channel, in particular at least approximately 92%. This results in an optimum distribution between bypass flow and main flow.

With respect to the least inside width of the flow channel, the guide element is offset upstream, contrary to the direction of flow. Preferably, the distance between the guide element, or the guide-element trailing edge, and the least inside width of the flow channel represents 20% to 30% of the length of the casing. Particularly preferably, this distance is at least approximately 23% to 25%.

Extensive simulations and tests have shown that the above-mentioned conditions result in an optimal efficiency.

Preferably, the airfoil profile of the casing is biconvex, i.e. both the radially inner upper side and the radially outer underside of the airfoil profile are convexly curved. In order to generate an optimal negative pressure with the bypass flow, the camber line runs, with respect to the chord line, i.e. the straight-line connection between the leading edge and the trailing edge, preferably on the radially inner side. The camber line is formed by the mid-points of the largest possible circles in the airfoil profile.

Preferably, the chord line is at least approximately parallel to the longitudinal axis, or it encloses an acute angle with the longitudinal axis, by means of a straight-line extension on the downstream side. This angle is preferably less than 5°. This measure also promotes optimal flow conditions.

It should be mentioned, however, that the chord line may move further away from the longitudinal axis, in the downstream direction, in order to enlarge the outlet. In this case, the chord line, by means of a straight-line extension on the upstream side, encloses with the longitudinal axis an acute angle that is preferably less than 10°, in particular less than 5°.

Preferably, the camber is 0.06 to 0.08, in particular at least approximately 0.07. The camber is to be understood to mean the greatest deviation of the camber line from the chord line, this greatest deviation being obtained by dividing by the length of the chord line.

The profile thickness is preferably 0.19 to 0.3, in particular at least approximately 0.22 to 0.24, in particular 0.23. The profile thickness is to be understood to mean the greatest possible circle diameter on the camber line, between the upper side of the profile and the underside of the profile. It is given by the ratio of this largest possible circle diameter by the length of the chord line.

The position of maximum camber is preferably 0.3 to 0.45, in particular at least approximately 0.36 to 0.38. The position of maximum camber is the distance from the leading edge to the point at the maximum height of the camber line. It is given by this distance in relation to the length of the chord line.

The airfoil profile according to the above specifications was also determined, on the basis of complex simulations, to be optimal for wind conditions in central northern latitudes.

Preferably, the guide element also has the cross-section of an airfoil profile, this airfoil profile preferably likewise being biconvex. In the case of the guide element, also, the chord line is preferably at least approximately parallel to the longitudinal axis.

Preferably, the rotor has a diameter of from 2.5 m to 6 m, in particular at least approximately 3 m.

Figure 2:
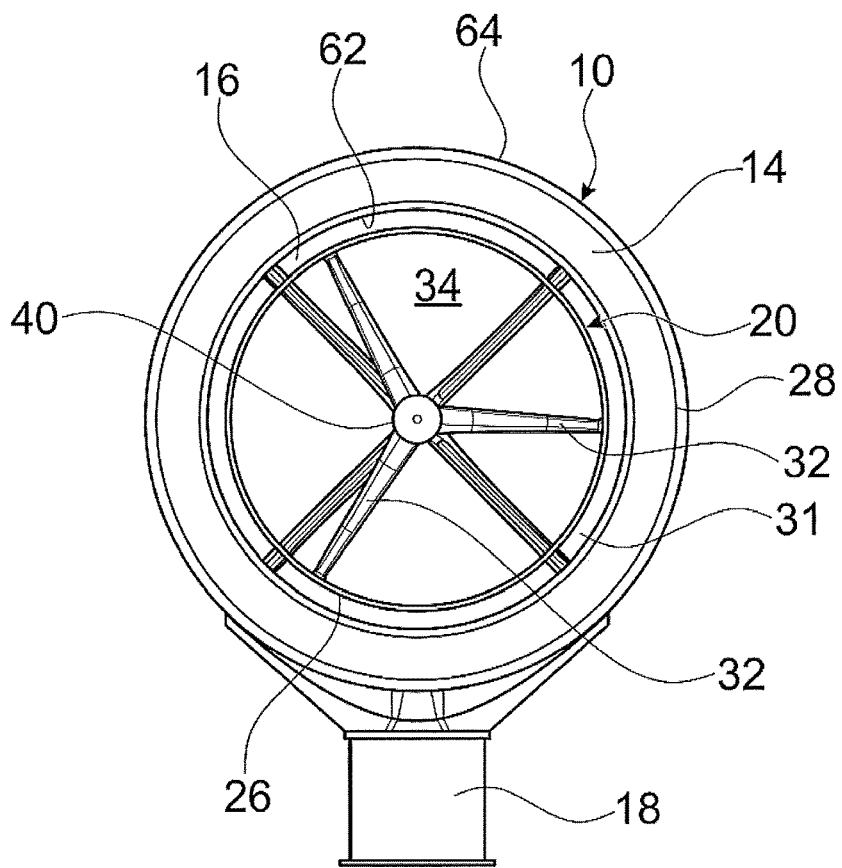
Figure 3:
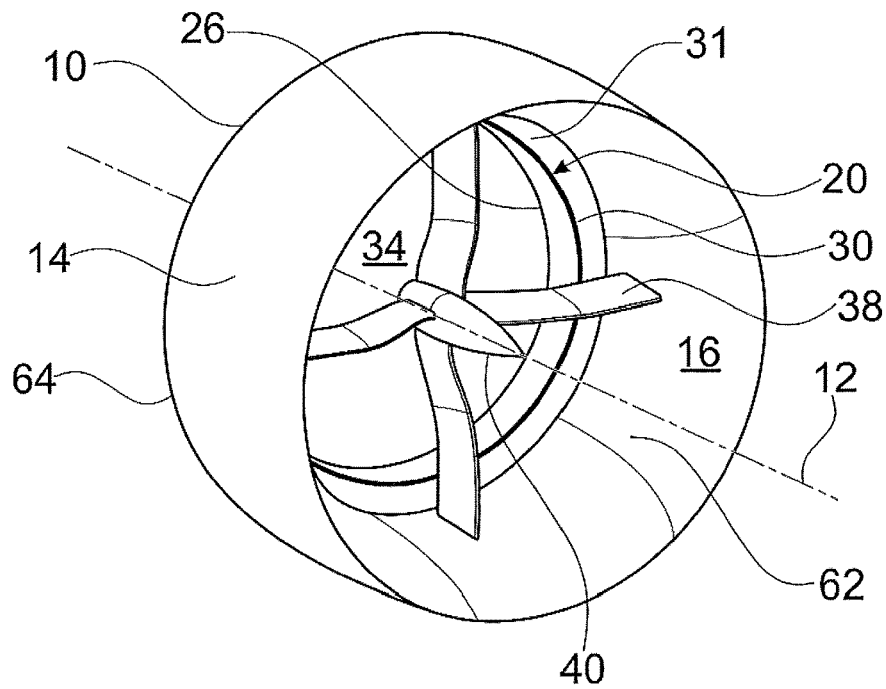
Figure 4:
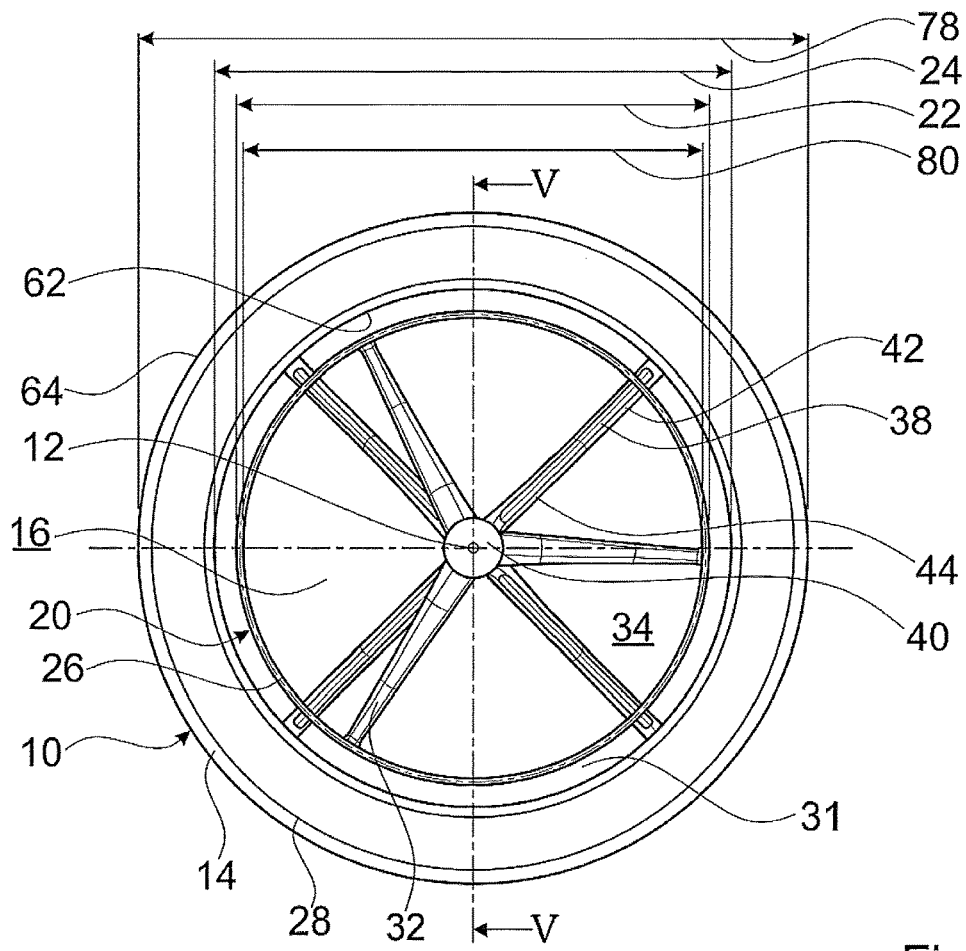
Figure 5:
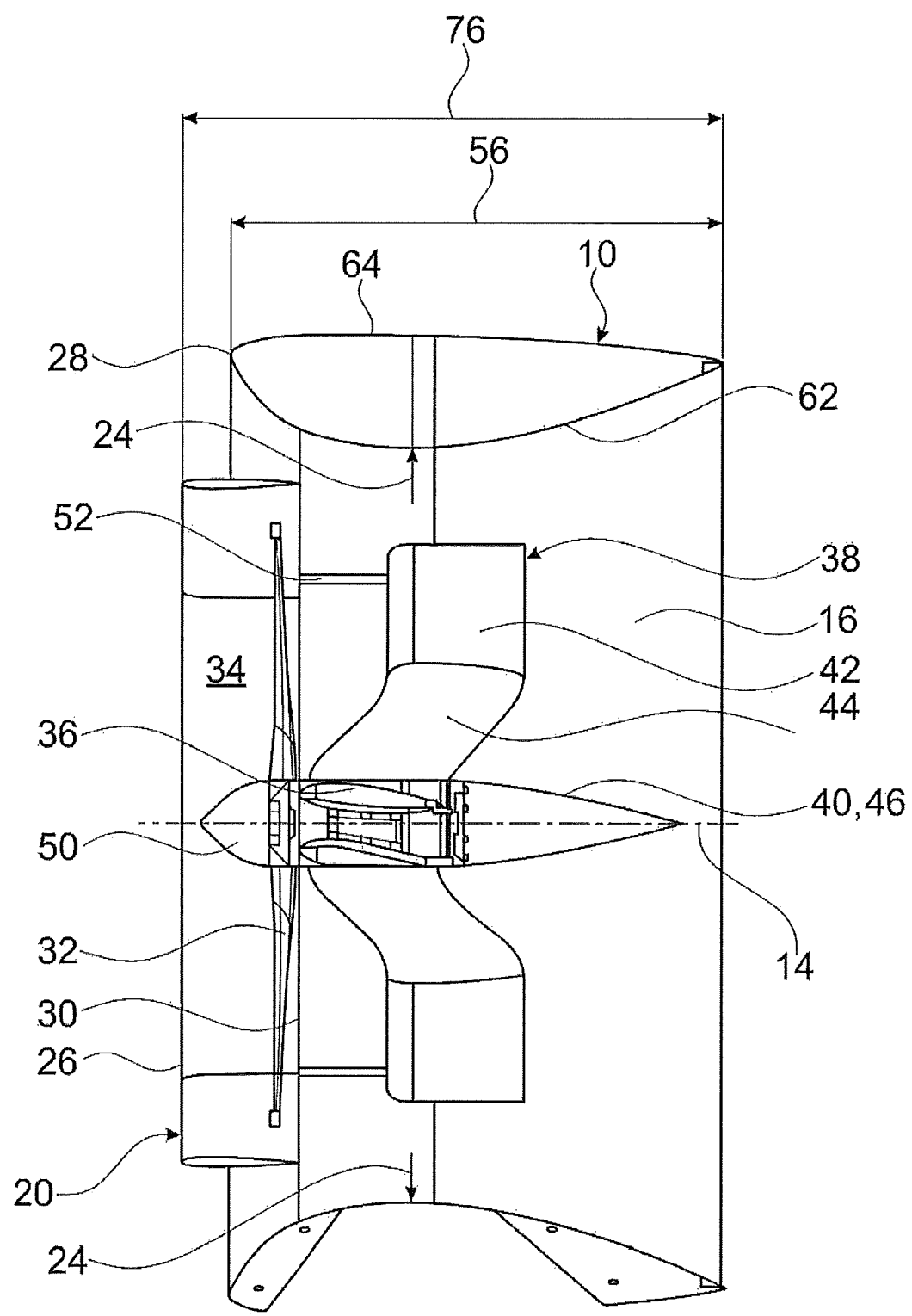
Figure 6:
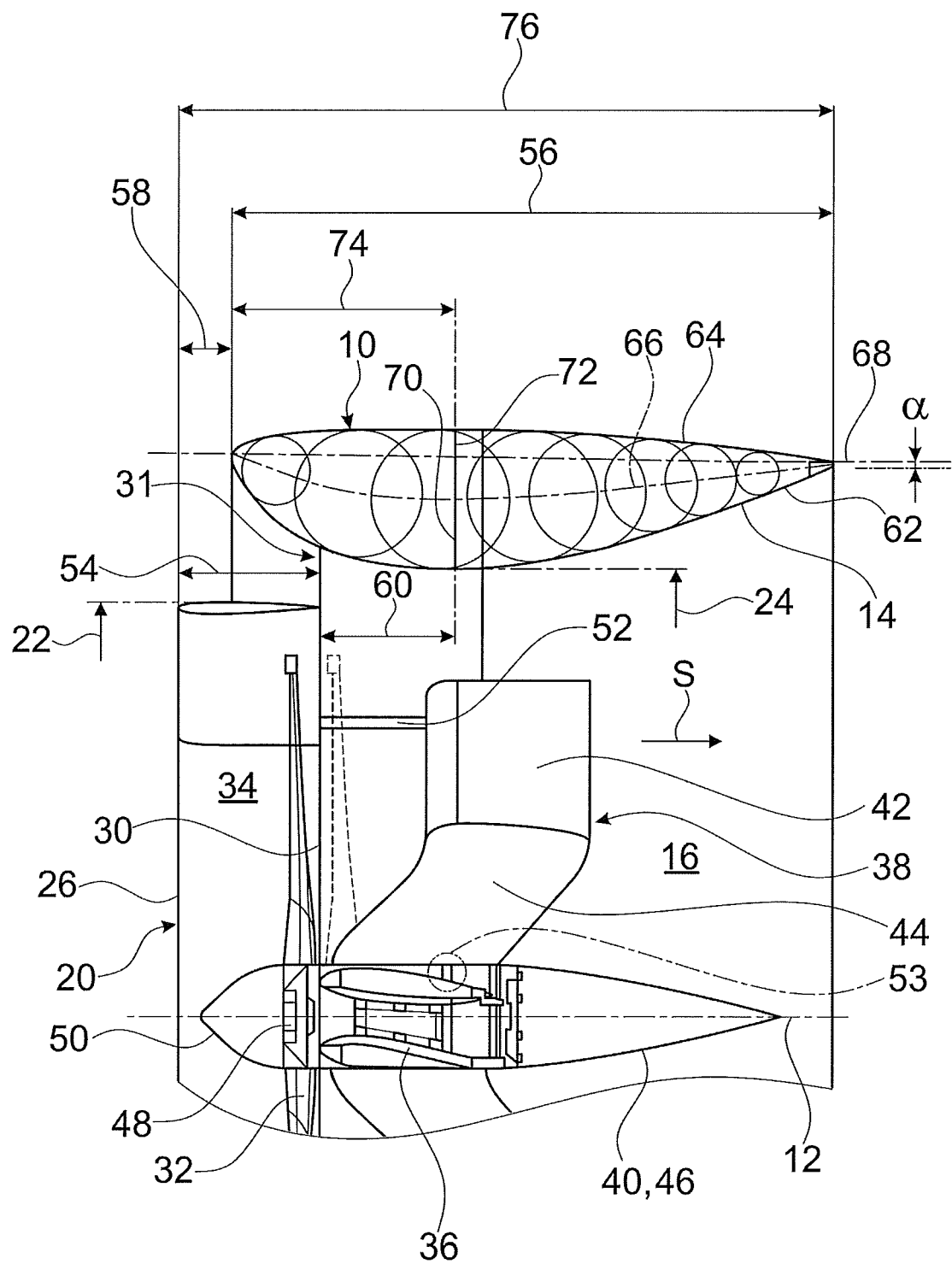

The invention is described in greater detail on the basis of an exemplary embodiment represented in the drawing. There are shown, in purely schematic form:

FIG. 1 a perspective representation of a flow energy installation designed as an encased wind turbine;

FIG. 2 the encased wind turbine according to FIG. 1, in a front view;

FIG. 3 the stationary parts of the encased wind turbine according to FIGS. 1 and 2, in a perspective oblique view from behind;

FIG. 4 a line drawing of the encased wind turbine according to FIGS. 1 to 3, in a front view;

FIG. 5 the encased wind turbine according to FIGS. 1 to 4, in a horizontal section along the section line V-V of FIG. 4; and FIG. 6 an enlarged detail of FIG. 5.

The encased wind turbine shown in the figures has a casing 10, which forms a shroud of the encased wind turbine. The casing 10 is rotationally symmetrical in relation to the longitudinal axis 12 of the encased wind turbine. The cross-section of the casing 10 forms an airfoil profile 14, as can be seen, in particular, from FIGS. 5 and 6.

The radially inner upper side 62 of the airfoil profile, and thus of the casing 10, delimits a flow channel 16 for the fluid, in the present case the wind, driving the encased wind turbine.

The casing 10 is supported by a, for example tubular, vertical support 18, which is rotatable about the vertical axis in order to optimally align the encased wind turbine with respect to the wind direction.

The encased wind turbine additionally has a self-contained, annular guide element 20 that is rotationally symmetrical in relation to the longitudinal axis 12. The greatest external diameter 22 (FIG. 6) of the guide element is less than the least inside width 24 of the flow channel 16.

The upstream end of the guide element 20, the guide-element leading edge 26, is arranged upstream from the leading edge 28 of the casing 10 with respect to the direction of flow S. The downstream end of the guide element 20, the guide-element trailing edge 30, is located downstream with respect to the leading edge 28, but upstream with respect of the least inside width 24.

The casing 10 and the guide element 20 thus delimit an annular bypass flow channel 31 for the wind.

The encased wind turbine additionally has a propeller 32, which in the exemplary embodiment has three blades, and which is mounted so as to be rotatable about the longitudinal axis 12. The propeller 32, as viewed in the direction of flow S, is located in an upstream end region of the guide element 20 that, measured from the guide-element trailing edge 30, extends over 20% of the length of the guide element 20. In the case of the embodiment shown, the propeller 32 is thus impinged on by the main fluid flow, which flows through the main flow channel 34 formed by the guide element.

The propeller 32 extends in the radial direction, with a gap that is structurally as small as possible, up to the guide element 20.

The propeller 32 drives a generator 36 for the purpose of generating electrical energy.

For completeness, it should be mentioned that the propeller 32, as viewed in the direction of the longitudinal axis 12, may be located at the guide-element trailing edge 30, or downstream from it, as is indicated in FIG. 6 by a propeller shown by a broken line. In the case of this embodiment also, however, the propeller 32 is located adjacently to the guide-element trailing edge 30, and upstream from the least inside width 24 of the flow channel 16.

In the exemplary embodiment shown, four supports 38 project inwardly from the casing 10 in the radial direction. They have the cross-section of a symmetrical airfoil, and at their radially inner end support a generator housing 40. This generator housing 40 is drop-shaped and rotationally symmetrical in relation to the longitudinal axis 12.

The supports 38 have a straight outer portion 42, which is at right angles to the longitudinal axis 12, and which extends from the casing 10 approximately to the mid-point between the casing 12 and the generator housing 40. An inner portion 44 adjoining the outer portion 42 is bent in an S shape. Adjoining the outer portion 42 it has a first curvature, contrary to the direction of flow S, and adjacent to the generator housing 40 it has an opposite, second, curvature. Between these curvatures the inner portion is straight, having an angle of approximately 45° in relation to the longitudinal axis 12.

The four mutually converging supports 38, arranged at an angle of 45° in relation to the horizontal, or to the vertical, support a stationary part 46 of the generator housing 40, in which the generator 36, and possibly a transmission, is/are arranged. Projecting with respect to this stationary part 46, contrary to the direction of flow S, is a shaft 48, on which the propeller 32 is seated and which is concentric with the longitudinal axis 12. An upstream part of the generator housing 40 is formed by a shaft cover 50 that rotates concomitantly with the shaft 48, and thus with the propeller 32, and contributes to optimal flow conditions.

For completeness, it should be mentioned that electrical lines run from generator 36, through at least one of the supports 38, and from there through the casing to the vertical support 18. On the one hand, this is to conduct away the generated electrical energy and, on the other hand, to carry control or sensor signals to or from the generator.

Projecting from the outer portion 42 of each of the supports 38, contrary to the direction of flow S, is an element support 52 that, at the other end, is connected to the guide-element trailing edge 30, in order to support the stationary guide element 20.

It should also be mentioned that it is possible for the axial position of the propeller 32 to be of a settable design. It is thus possible to provide an actuator 53, preferably arranged in the generator housing 40, to shift the propeller 32 in its axial position, preferably by shifting the generator housing 40 with respect to the support 38. In this case, the supports 38 are preferably displaced downstream with respect to their position represented in the drawing.

In the exemplary embodiment shown, the length 54 of the guide element, measured in the direction of the longitudinal axis 12, is 23% of the length 56 of the casing 10.

In the exemplary embodiment shown, the external diameter of the guide element 22 is 92% of the least inside width 24 of the flow channel 16.

Measured in the direction of the longitudinal axis 12, the guide-element leading edge 26 is 40% upstream from the leading edge 28 of the casing, relative to the length 56 of the casing 10. This projection is denoted by 58 in FIG. 6.

In the exemplary embodiment shown, the distance 60 between the guide element 20, and thus its guide-element trailing edge 30, and the least inside width 24 of the flow channel 16 is 24% of the length 56 of the casing 10.

For completeness, it should be mentioned that the cross-section of the guide element 20 is also convex, but elongated. In other words, the radial thickness of the guide element 20 is small in relation to its length 54.

The cross-section of the casing 10 is biconvex; consequently, the upper side 62 of the profile, delimiting the flow channel 16, and also the radially outer underside 64 of the profile are curved convexly.

The camber line 66 of the airfoil profile 14 of the casing 10 runs, with respect to the chord line 68, on the radially inner side that faces toward the longitudinal axis 12. The airfoil profile 14 thus has a more pronounced radially inward than radially outward camber.

The chord line 68 encloses a small angle α of 2° between a straight-line, downstream extension and the longitudinal axis.

The camber 70 is 0.07, the profile thickness 72 is 0.23, and the position of maximum camber 74 is 0.37.

In the exemplary embodiment shown, the length 76 of the encased wind turbine is approximately 10% longer than the length 56 of the casing 10.

The length 76 of the encased wind turbine may be, for example, 2.4 m, and the length 56 of the casing, for example, 2.2 m. Accordingly, the external diameter 78 of the casing may be 4.4 m, the external diameter of the guide element 3.1 m, and the diameter of the rotor 3.0 m. However, the encased wind turbine may be of a larger or smaller design than these dimensions.

The invention claimed is:

1. A flow energy installation, in particular encased wind turbine, comprising:
    an annular casing, which defines a longitudinal axis and which is at least approximately rotationally symmetrical in relation to the longitudinal axis, and which has the cross-section of an airfoil profile, and a radially inner upper side of which delimits a flow channel for a fluid;
    an annular guide element, which is at least approximately rotationally symmetrical in relation to the longitudinal axis, with a proviso that:
        a greatest external diameter of the guide element is less than a least inside width of the flow channel of the casing,
        a guide-element leading edge of the guide element is arranged upstream from a leading edge of the casing in the direction of flow of the fluid, and
        a guide-element trailing edge of the guide element is arranged upstream from the least inside width of the flow channel; and
    a propeller, which is arranged in the flow channel, is rotatable about the longitudinal axis, and is impinged on by the fluid, for the purpose of driving an electrical generator, wherein:
    the guide-element trailing edge of the guide element is arranged downstream from the leading edge of the casing, and
    the propeller, as viewed in the direction of flow, is located at least approximately at the guide-element trailing edge.

2. The flow energy installation as claimed in claim 1, wherein a diameter of the propeller is at least approximately as great as an inside width of the guide element.

3. The flow energy installation as claimed in claim 2, wherein the propeller is located in a downstream end portion of the guide element that, measured in the direction of the longitudinal axis and from the guide-element trailing edge, extends over a quarter of a length of the guide element.

4. The flow energy installation as claimed in claim 1, wherein, projecting inwardly from the casing, at least approximately in the radial direction, there are supports, which support a generator housing, which has an at least approximately drop-shaped longitudinal section that is at least approximately rotationally symmetrical in relation to the longitudinal axis, and in which are arranged the generator and a shaft that carries the propeller and the supports have a symmetrical airfoil profile.

5. The flow energy installation as claimed in claim 4, wherein the supports have an at least approximately straight outer portion that runs at least approximately at right angles to the longitudinal axis and adjoins the casing, and between this outer portion and the generator housing they have an inner portion bent at least approximately in an S shape.

6. The flow energy installation as claimed in claim 4, wherein, projecting from the supports, contrary to the direction of flow and at least approximately parallel to the longitudinal axis, are element supports that support the guide element.

7. The flow energy installation as claimed in claim 1, wherein, measured in the direction of the longitudinal axis, a length of the guide element is 15% to 30% of a length of the casing.

8. The flow energy installation as claimed in claim 1, wherein, measured in the direction of the longitudinal axis, the guide element projects by 30% to 50% of a length of the guide element, contrary to the direction of flow, over the casing.

9. The flow energy installation as claimed in claim 1, wherein the external diameter of the guide element is 85% to 96% of the least inside width of the flow channel.

10. The flow energy installation as claimed in claim 1, wherein, measured in the direction of the longitudinal axis, a distance between the guide element and the least inside width of the flow channel represents 20% to 30% of a length of the casing.

11. The flow energy installation as claimed in claim 1, wherein the airfoil profile of the casing is biconvex, wherein a camber line runs, with respect to a chord line, on a side that faces toward the longitudinal axis.

12. The flow energy installation as claimed in claim 11, wherein the chord line is at least approximately parallel to the longitudinal axis, or a downstream straight extension of the chord line and the longitudinal axis enclose an acute angle.

13. The flow energy installation as claimed in claim 11, wherein the camber is 0.06 to 0.08.

14. The flow energy installation as claimed in claim 11, wherein the profile thickness is 0.19 to 0.30.

15. The flow energy installation as claimed in claim 1, wherein the position of maximum camber is 0.3 to 0.45.

16. The flow energy installation as claimed in claim 1, wherein the guide element has the cross-section of an airfoil.

17. The flow energy installation as claimed in claim 16, wherein the cross-section of the guide element is biconvex, and a chord line of the guide element is at least approximately parallel to the longitudinal axis.

* * * * *